United States Patent [19]
Satake et al.

[11] Patent Number: 5,808,242
[45] Date of Patent: Sep. 15, 1998

[54] ELECTROMAGNETIC FLOW RATE MEASURING APPARATUS AND METHOD FOR COMPENSATING THE MEASURED FLOW RATE

[75] Inventors: Satoru Satake, Tokyo; Yasuharu Mitoma; Katsunori Ito, both of Hiroshima, all of Japan

[73] Assignee: Satake Corporation, Tokyo, Japan

[21] Appl. No.: 706,120

[22] Filed: Aug. 30, 1996

[30] Foreign Application Priority Data

Aug. 30, 1995 [JP] Japan .................................. 7-246732
May 22, 1996 [JP] Japan .................................. 8-151711

[51] Int. Cl.$^6$ .......................... G01G 11/14; G01G 13/00; B67D 5/08
[52] U.S. Cl. .......................... 177/210 C; 177/16; 177/60; 177/50; 222/55; 222/59
[58] Field of Search .................... 177/210 C, 16, 177/17, 50, 60, 119, 120; 222/52, 55, 59, 64, 77

[56] References Cited

U.S. PATENT DOCUMENTS

| | | | |
|---|---|---|---|
| 4,461,363 | 7/1984 | Loy | 177/1 |
| 4,716,768 | 1/1988 | David et al. | 73/861 |
| 4,917,199 | 4/1990 | Loshbough | 177/210 C |
| 5,038,973 | 8/1991 | Gmur | 222/56 |
| 5,078,220 | 1/1992 | Briefer | 177/210 C |
| 5,343,761 | 9/1994 | Myers | 73/861.73 |

*Primary Examiner*—Michael L. Gellner
*Assistant Examiner*—Anh Mai
*Attorney, Agent, or Firm*—Fish & Richardson P.C.

[57] ABSTRACT

An electromagnetic flow rate measuring apparatus measures and calculates a flow rate of granules based on a measurement of capacitance which changes according to the quantity of the granules flowing at a granule passage. The measuring apparatus includes a granule flow pipe which is coupled to the granule passage and is provided in the course of the granule passage, a capacitance detector provided to the granule flow pipe, shutters respectively provided at an upper end and a lower end of the granule flow pipe, for cutting off the flow of granules, the shutters being individually operable, and a load cell type weight detector independently supporting the granule flow pipe. The shutters, the load cell type weight detector, and the capacitance detector are connected to a calculation control device. The measuring apparatus provides a flow rate which is not influenced by the moisture content or the density of the granules.

4 Claims, 6 Drawing Sheets

ELECTROMAGNETIC FLOW RATE MEASURING APPARATUS AND METHOD FOR COMPENSATING THE MEASURED FLOW RATE

BACKGROUND OF THE INVENTION

1. Field of the Invention

This invention relates to an electromagnetic flow rate measuring apparatus for measuring and calculating a flow rate of the granules or fine particles based on the measurement of the capacitance at the flow passage, which capacitance changes according to the flow rate of the granules flowing at the passage. This invention also relates to a method for producing a compensated flow rate based on the actual flow rate measured by the measuring apparatus.

2. Description of the Related Art

As the conventional flow rate measuring apparatuses for granules, there are a batch-type actual weight measuring apparatus which uses a weighing machine, an impact-type measuring apparatus wherein the changes in the pressure by the flow materials are measured and converted into the flow rate, and an electromagnetic flow rate measuring apparatus wherein the capacitances at the flow passage which changes according to the quantity of the flow materials thereat are measured and converted into the flow rate.

The batch-type actual weight measuring apparatus is superior to other measuring apparatuses in the point of accuracy because the actual flow rate can be measured by the apparatus. However, as the batch-type apparatus uses an intermittent operation, the apparatus necessitates the provision of an additional device for stably regulating the flow of granules at the following stage so that the intermittent operation causes no influence on other apparatuses or devices. This batch-type apparatus inevitably becomes large because of the necessity of the additional regulating device and, thus, it cannot necessarily be installed to all the desired places with ease.

In the impact-type or the electromagnetic type flow rate measuring apparatus, as only the detector portion can be independently provided to the flow passage, the overall measuring apparatus can be made very compact as compared with the batch-type apparatus. For this reason, chances of adopting the impact-type or the electromagnetic type measuring apparatus have increased recently. However, as explained before, as the actual value is not directly measured in these type measuring apparatuses, the accuracy of the measured flow rate is rather low and, thus, the measured flow rate is practically used as only a guidepost. One of the reasons in which the accuracy of the measured values obtained by the impact-type or the electromagnetic type measuring apparatus is low is that the value is influenced by the changes in density due to the nature of the granules.

As the impact-type apparatus is provided with a plate at a granule passage, which plate directly and continuously receives a pressure from the granules, it is necessary that the structure be rigid when the quantity of granules is large. Further, this impact-type apparatus should be provided with a means for anti-abrasion and a means for prevention of granule adhering on the plate.

On the other hand, because the electromagnetic flow rate measuring method wherein capacitance is converted into a flow rate has such a simple construction that a coil type capacitance detector provided around the granule flow pipe is connected to a calculation control device for converting the detected value into the flow rate. One of the features in this method is that the detector does not directly contact the granules. Further, even if the quantity of the granules becomes large, only the diameter of the detector may be changed in accordance with the changes in the diameter of the granule flow pipe but the length of the detector may not be large because the detector is constituted by a coil. The electromagnetic measuring apparatus is advantageous in that the overall structure does not become large even where the quantity of granules becomes large. For this reason, in recent years, the adoption of this electromagnetic measuring apparatus has increased.

However, since the capacitance is measured and then converted into the flow rate, it is evident that the capacitance is influenced by the moisture content and density of the granules. The changes in the measured values of the capacitances cause the changes in the converted values. As a result, there occurs an error in the flow rate. Practically, this error has been compensated manually by the operator.

SUMMARY OF THE INVENTION

It is, therefore, a primary object of the invention to provide an electromagnetic flow rate measuring apparatus in which an accurate flow rate can be obtained by effectively compensating the error of the measured capacitance which is influenced by the moisture content and density of the granules.

According to an aspect of the invention, there is provided an electromagnetic flow rate measuring apparatus for measuring a flow rate of granules based on the measurement of capacitance which changes according to the quantity of the granules flowing at a granule passage, the apparatus comprising:

a measurement passage which is provided in the course of the granule passage and coupled to the granule passage and in which the granules flow;

a capacitance detector which has electrodes provided with respect to the measurement passage and which detects capacitance that changes in accordance with the granules flowing in the measurement passage;

an upper and a lower shutter which are respectively and independently provided at an upper portion and a lower portion of the measurement passage and which temporarily prevent flow-in of the granules into the measurement passage and flow-out of the granules from the measurement passage;

a load cell type weight detector on which said measurement passage is mounted and which measures an actual weight of the granules that are accumulated in the measurement passage within a predetermined time based on the operation of the upper and lower shutters; and a calculation control means which converts the capacitance of the granules detected by the capacitance detector and which compensates the converted values of flow rate from the capacitance, with a predetermined cycle, based on the actual weight measured by the load cell type weight detector.

The calculation control means has, as its operation modes, a normal mode for conducting a flow rate calculation based on a signal received from the capacitance detector and a compensation mode for conducting a flow rate calculation based on the signals received from both the capacitance detector and the load cell type weight detector.

The electromagnetic flow rate measuring apparatus, in which the capacitance detector and the load cell type weight detector are provided to the same granule passage, calculates a flow rate or density based on the actual weight measured by the load cell type detector and, then, using the resultant flow rate or density as a coefficient for a flow rate conversion by the apparatus, compensates the difference between the measured value measured by the capacitance detector caused by the changes in the density of the granules and the actual value measured by the load cell type weight detector.

The operation of the apparatus according to the invention is as follows. In the apparatus of the invention, a granule flow pipe serving as a measurement passage and having a predetermined length is provided in the course of the granule flow passage and coupled thereto. A capacitance detector is provided to this flow pipe. The granule flow pipe is provided with, at its upper and lower portions, shutters which independently operate and cut off the flow passage. The granule flow pipe (measurement passage) is independently suspended by the load cell type weight detector. The respective detectors and shutters are connected to the calculation control means. The detectable values in the apparatus having the above construction are a capacitance value detected by the capacitance detector and an actual weight value detected by the weight detector. The measurement is conducted in the normal mode and the compensation mode.

In the measurement of the normal mode, the capacitance of the granules is detected while the granules flows in the granule flow pipe in the state where both the shutters are opened and, then, the detected capacitance is converted into the flow rate of the granules by the calculation control means. As the flow rate thus measured and calculated is greatly influenced by the moisture content and the density of the granules, the conversion from the capacitance into the flow rate cannot always be performed using the same conversion coefficient. In the prior art, this conversion coefficient is changed according to the moisture content and density which are separately measured. Practically, a plurality of coefficients have been manually switched over or selected.

In the apparatus according to the invention, the compensating operation in the compensation mode is performed with a predetermined cycle of time. More specifically, in the compensation mode, the lower shutter is so operated that the lower end of the flow pipe is closed. In this way, the granules flow in the flow passage are accumulated in the granule flow pipe and, after the lapse of a predetermined time, the upper shutter is so operated that the upper end of the same pipe is closed. Thus, the supply of the granule flowing in the flow passage into the measurement passage is completely cut off.

At this time, by detecting the weight of the granules accumulated in the granule flow passage by the load cell type weight detector, the weight of the granules per a unit detection time which are currently flowing, that is, the actual flow rate of the granules can be obtained. By comparing this actual flow rate with the flow rate converted from the capacitance value detected by the capacitance detector with compensation by the temperature detected by the temperature detector being added, the conversion coefficient applied on the calculation formula for converting into the flow rate from the capacitance is changed so that the difference resulted from the above comparison is made zero. By so doing, the flow rate thus obtained based on the conversion from the capacitance value can be treated as an accurate value without an error.

Upon completion of the detection of the actual weight value measured by the load cell type weight detector in the compensation mode, both the upper and lower shutters are opened so that the granules start to flow again in the granule flow pipe, whereby it is possible to perform the detection of the capacitance value by the capacitance detector. In this state, using the appropriately compensated calculation formula and the temperature compensation, it is possible to perform the precise flow rate conversion and thus to obtain an accurate flow rate.

More detailed explanation of the operation in the normal and compensation modes is made hereunder. By measuring an output voltage from the capacitance detector and then converted into capacitance at the time when there flows no granule in the flow passage, a vacant capacitance can be obtained and is treated as a standard for the capacitance detection. Further, by measuring an output voltage from the load cell type weight detector and then converted into weight at the time when there flows no granule in the flow passage, a vacant weight can be obtained and is treated as a standard for the actual weight detection. It should be noted that the zero-point or span which are necessary for the actual weight detection by the load cell type detector have been set in advance.

In the compensation mode, the capacitance value of the granules is measured while the granules are flowing on the flow passage. Next, the lower shutter is operated so that the lower end of the granule flow pipe is closed. In this way, the granules flowing in the flow passage are accumulated in the granule flow passage. After the lapse of the predetermined period of time, the upper shutter is operated so that the upper end of the flow pipe is closed, whereby the flow of granules is cut off. By detecting the weight of the granules accumulated in the flow pipe by the load cell type weight detector, the actual flow rate can be calculated from the detected weight and the above predetermined time. In this way, the capacitance and the weight of the granules under the same condition can be detected.

In the normal mode, the capacitance of the granules flowing in the flow passage is measured and the capacitance measured at the normal mode is applied to the calculation formula in which the difference between the capacitance at the above compensation mode and the vacant capacitance, and the difference between the capacitance at the normal mode and the above vacant capacitance, the actual flow rate at the compensation mode and also the predetermined coefficients are used. The flow rate thus obtained is a value which is compensated by the various values measured at the compensation mode. Further, by adding on the capacitance the temperature compensation performed by the temperature detector, a further precise coefficient can be obtained.

The compensation mode is so programmed that it be conducted with an appropriate interval. In this way, the flow rate conversion from the capacitance is appropriately compensated with a regular interval being placed. Though, in the compensation mode, a batch type measurement of weight is conducted temporarily, since the time wherein the flow of granules is stopped is very short unlike in the conventional batch type measuring apparatus and such operation is conducted with a certain interval, the overall flow in the system is not influenced thereby. Further, since the detection of weight of the granules is done by the flow pipe located in the course of the flow passage and is done in the state wherein the upper and lower shutters of the flow pipe are operated in the compensation mode, the apparatus does not receive the constant falling pressure of the granules unlike the conventional impact-type apparatus. In the normal mode, the flow pipe functions as a mere pipe to which electrodes of the capacitance detector are attached.

BRIEF DESCRIPTION OF THE DRAWINGS

The above and other objects, features and advantages of the present invention will be apparent from the following description of preferred embodiments of the invention explained with reference to the accompanying drawings, in which.

PREFERRED EMBODIMENTS OF THE INVENTION

Figure 1:
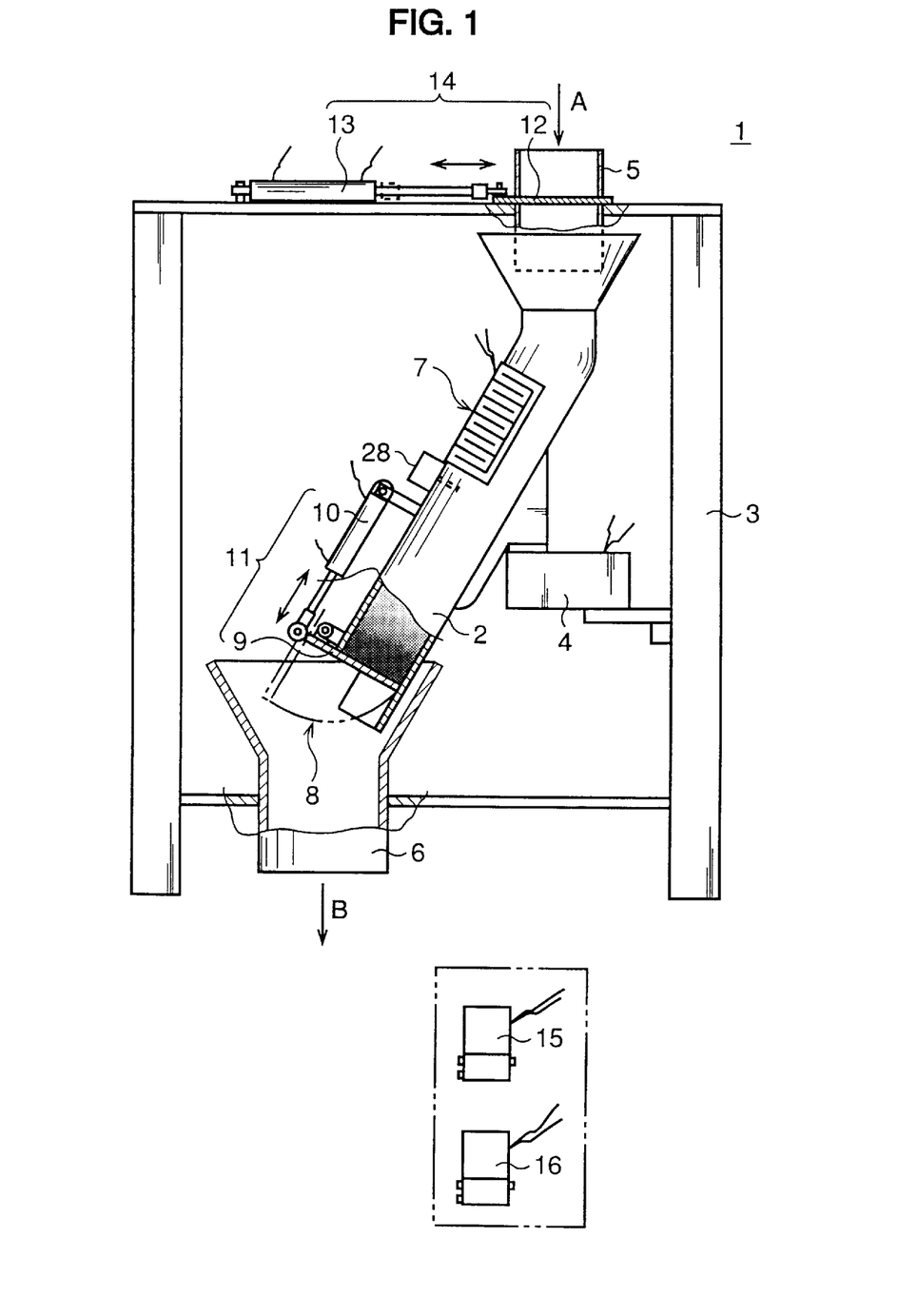
FIG. 1 is a diagrammatic view of the electromagnetic flow rate measuring apparatus according to the invention.

Now, a preferred embodiment of the invention will be explained hereunder with reference to FIGS. 1–4 of the accompanying drawings. FIG. 1 shows a structure of the electromagnetic flow rate measuring apparatus 1. A granule flow pipe 2 is provided in the course of a flow passage A–B on which granules flows. This granule flow pipe (measurement passage) 2 is supported by only a load cell weight detector 4 fixed to the machine frame 3. That is, the flow pipe 2 is supported by the detector 4 in such a manner that it is floated from other pipes 5 and 6 in the flow passage A–B. On a surface of the flow pipe 2, there is provided a capacitance detector 7, and at a predetermined position in the flow pipe 2, there is provided a level detector 28. At an exit port 8 located at the lower end of the flow pipe 2, there is provided a lower shutter 11 formed by a rotatable plate 9 and an air cylinder 10. An upper shutter 14 formed by a slidable plate 12 and an air cylinder 13 is provided to the pipe 2 of the granule flow passage A. The granule flow passage is cut off by the operation of the upper and lower shutters 14 and 11. The air cylinders 13 and 10 are respectively connected to the electromagnetic valves 15 and 16 through air pipes (not shown), and perform reciprocal movements according to the operation of the valves 15 and 16 actuated by the electric signals. The upper and lower shutters 14 and 11 are opened or closed according to the reciprocal movements of the cylinders 13 and 10. Torque actuators may be used as driving means instead of the air cylinders 10 and 13.

Next, an electric structure of the electromagnetic flow rate measuring apparatus 1 of the invention will be explained with reference to FIG. 2. The capacitance detector 7 is connected to a calculation control circuit 19 through a detection unit 27 and an amplifier 17, and the load cell weight detector 4 is connected to the same circuit 19 through an amplifier 18. The calculation control circuit 19 is constituted by a micro-computer board which has a CPU as a main element and further has various memories, input/ output devices, and A/D converters.

The electromagnetic flow rate measurement is achieved by the capacitance detector 7 provided to the flow passage 2, the detection unit 27, the amplifier 17 and the calculation control circuit 19. The weight measurement is achieved by the load cell type weight detector 4, the amplifier 18, the calculation control circuit 19 and the above explained batch mechanism formed by the plates 9 and 12. The calculation control means 32 is formed by the calculation control circuit 19, the detection unit 27 and the amplifiers 17 and 18.

The calculation control circuit 19 outputs signals to a display means 20, a communication port 21 and an I/O port 22 having a D/A converting function. The I/O port 22 has an analog output terminal 23 which outputs an analog signal corresponding to the flow rate, the level of the analog signal being in the order of 0–12 V and 4–20 mA. The I/O port 22 further has an output terminal 24 which outputs operation signals for the electromagnetic valves 15, 16 that control the open/close operation of the rotatable plate 8 and the slidable plate 12. The I/O port 22 further has an input terminal 25 which receives a detection signal from the level detector 28 provided inside the flow pipe 2. A stabilized power source 26 connected to the AC power supply line supplies a power source to the calculation control circuit 19. A temperature detector 40 may be connected to the calculation control means 19. The calculation control circuit 19 has, as its operation modes, a normal mode and a compensation mode which can be selected by the operator and which are explained later. Continuous capacitance detection is conducted in the normal mode, while both the weight detection and the capacitance detection are conducted in the compensation mode.

Figure 3:
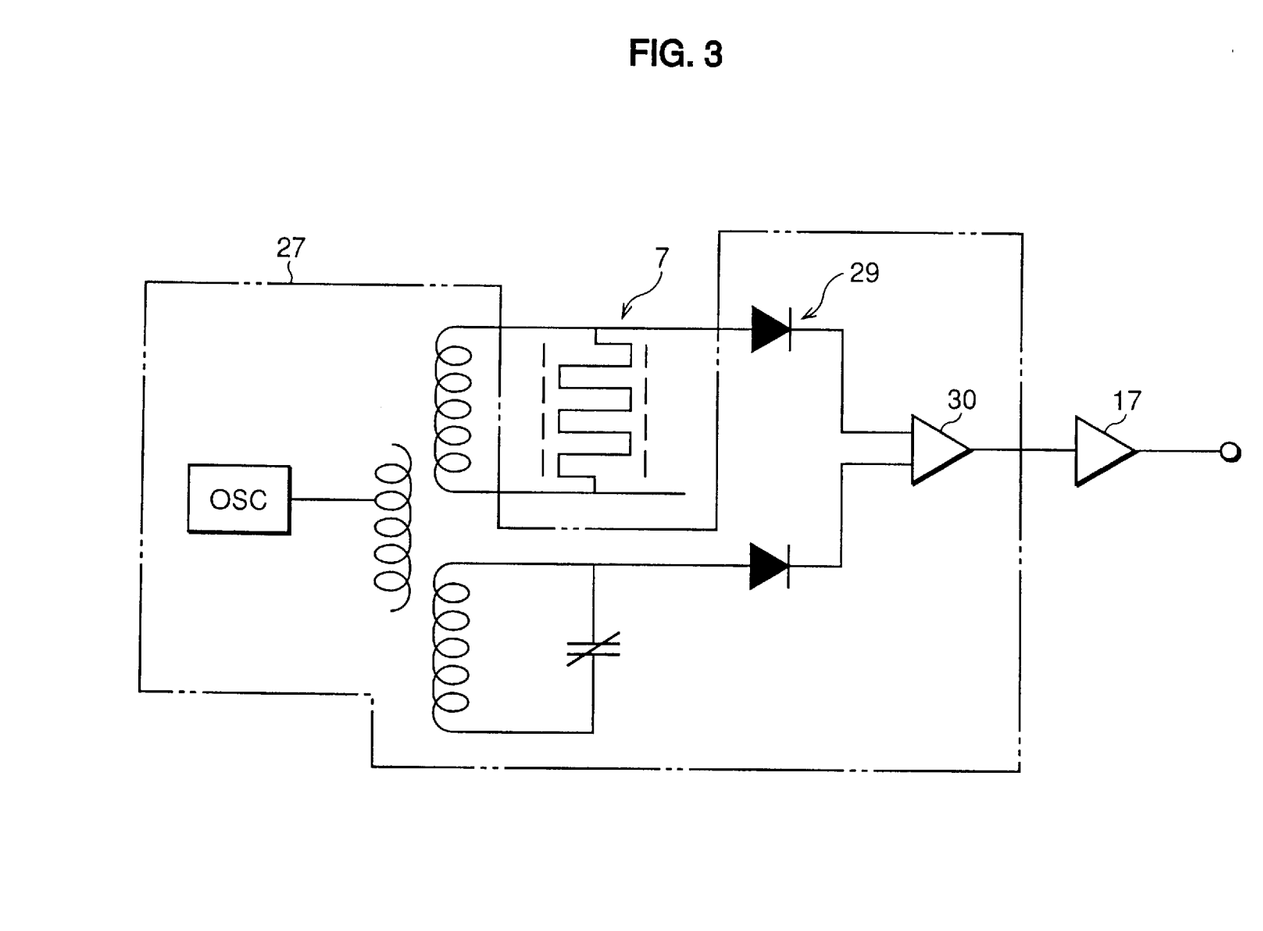
FIG. 3 is a circuit diagram of the capacitance detector used in the apparatus according to the invention.

FIG. 3 shows a detailed circuit diagram of the detection unit 27. The detection unit 27 formed by diodes 29 and a differential amplifier 30 outputs as a potential difference between the electrodes the changes in the capacitance detected by the capacitance detector 7, of the granules flowing in the flow pipe 2. Various detectors provided to the flow pipe 2 are connected to the calculation control means 32 through signal lines. For the purpose of conducting the temperature compensation on the detected capacitance value, there is provided a temperature detector (not shown) for detecting the temperature of the granules. The temperature value detected by the temperature detector is inputted to the calculation control means 32.

In the illustrated embodiment, though a batch-type means having the plates 12, 9 respectively provided at the upper and lower ends of the granule flow pipe 2 is shown and explained, a separate bypass to which the load cell type weight detector is fixed may be provided independently from the granule flow passage. In this case, in the compensation mode, the flow passage is switched to the bypass for a predetermined period of time.

Figure 2:
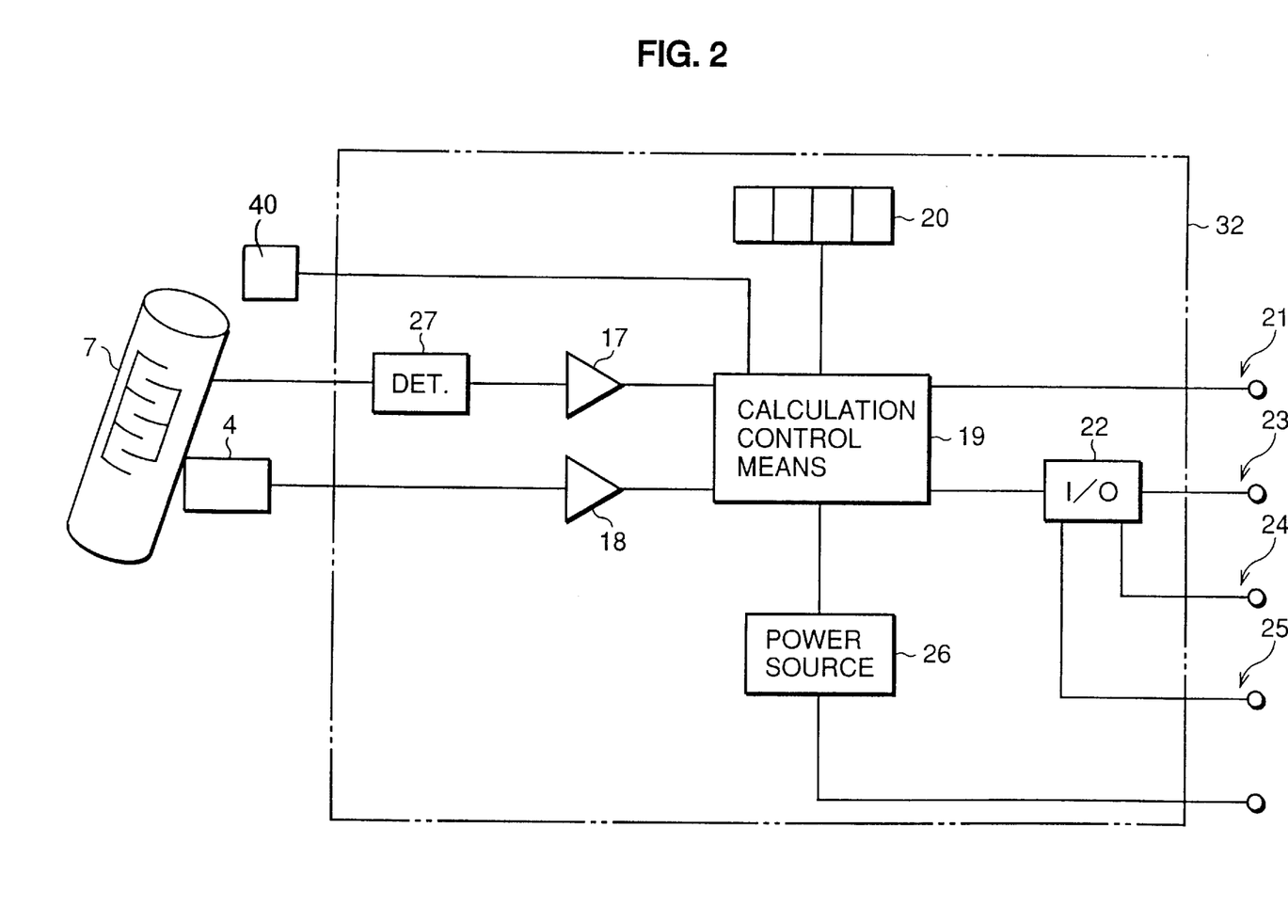
FIG. 2 is an electric block diagram of the electromagnetic flow rate measuring apparatus according to the invention.
Figure 4:
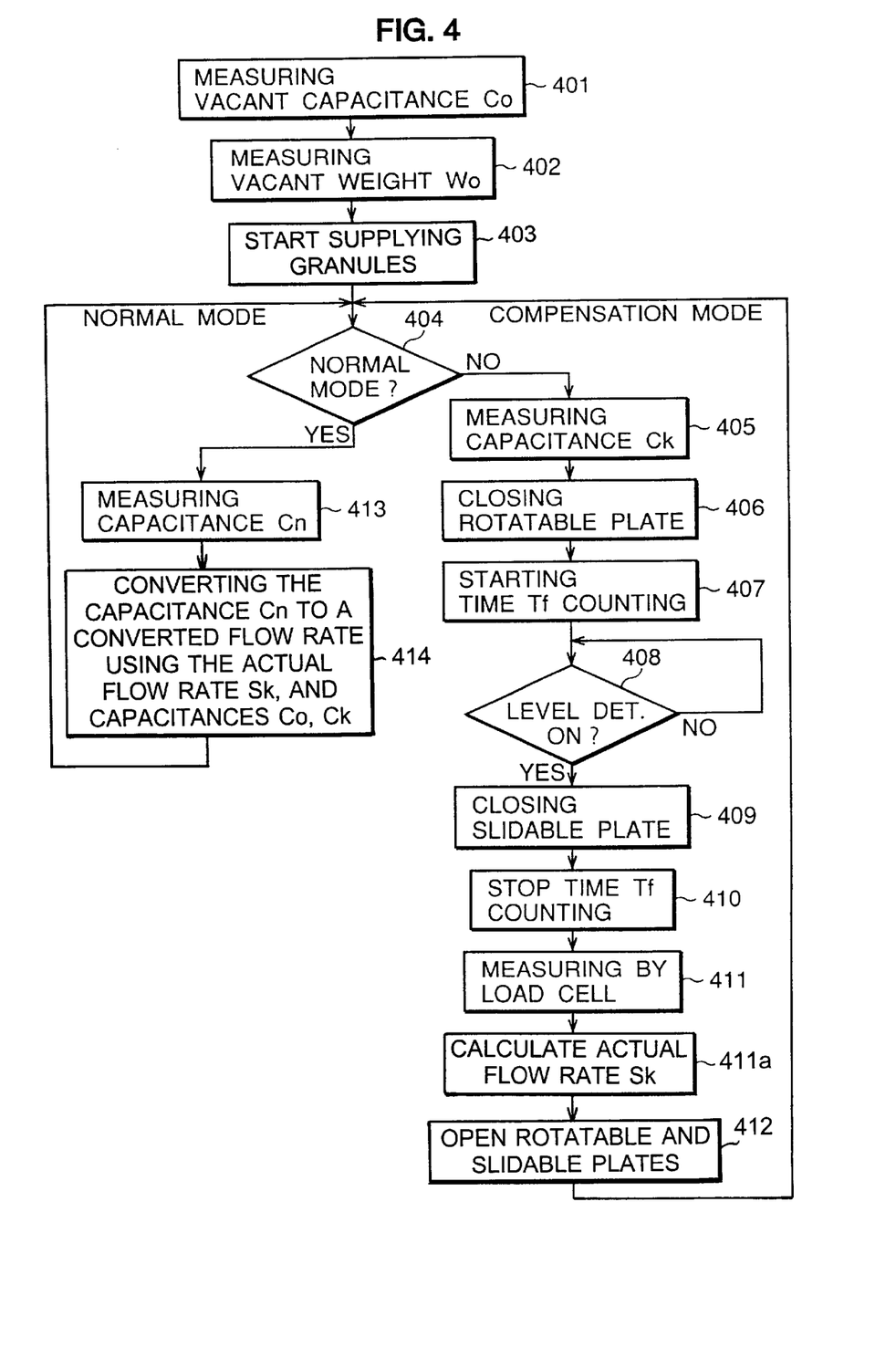
FIG. 4 is a flow chart showing the compensation mode and the normal mode.

An example of operation in the apparatus having the above structure is explained hereunder with reference to a flow chart of FIG. 4 in addition to FIGS. 1–3. FIG. 1 shows a state of the compensation mode wherein both the slidable plate 12 and the rotatable plate 9 are closed. The normal measurement by the electromagnetic flow rate measuring apparatus 1, that is, the measurement of capacitance by the capacitance detector 7 in the normal mode is conducted under the state wherein both the plates 12 and 9 are opened.

First, the calculation control circuit 19 outputs signals to the electromagnetic valves 15 and 16 so that the plates 9 and 12 are caused to be an open state. Next, in a step 401, a vacant capacitance $C_o$ is measured by the detection of the output from the capacitance detector 7 under the state where no granule is flowing in the granule flow passage. Then, in a step 402, a vacant capacitance $W_o$ is measured by the detection of the output from the load cell type weight detector 4 under the same state. In this way, the capacitance $C_o$ and the weight $W_o$ in the initial state are obtained.

Next, in a step 403, a supply allowance signal is outputted from the calculation control circuit 19 to an external shutter means (not shown) so that supply of the granules to the granule flow pipe 2 is started. After the issuance of the supply allowance signal, the calculation control circuit 19 confirms as to which mode the current mode is between the normal mode and the compensation mode, and enters into either one of the modes. Here, explanation is made on the assumption that the initial mode is set to the compensation mode.

Here, the granules have already started to flow in the granule flow pipe 2. In the compensation mode, in a step 405, firstly the calculation control circuit 19 operates to measure the capacitance $C_k$ based on an output from the capacitance detector 7 at a time when the granules are flowing in the pipe and the temperature of the granules based on an output from the temperature detector (not shown) provided in an external granule tank (not shown).

Subsequently, the calculation control circuit 19 outputs a signal to the electromagnetic valve 15 to operate the cylinder 10 of the lower shutter 11, so that the granule exit port 8 is closed by the rotatable plate 9 in a step 406. Simultaneously with the issuance of the output to the electromagnetic valve 15, the calculation control circuit 19 starts to count a time $T_f$ in a step 407. The granules accumulate within the granule flow pipe 2 after the closed operation of the lower shutter 11. When the accumulating granules reach the predetermined level within the pipe, this is detected by the level detector 28 provided inside the granule flow pipe 2. In a step 408, the calculation control circuit 19 monitors the detection signal from the level detector 28 and, upon receipt of the detection signal from the detector 28, it outputs a signal to the electromagnetic valve 16 so as to operate the cylinder 13 of the upper shutter 14. In a step 409, the slidable plate 12 closes the pipe 5 of the flow passage A. As a result, supply of the granules to the granule flow pipe 2 is cut off. Further, simultaneously with the issuance of the signal output to the electromagnetic valve 16, the calculation control circuit 19 stops the counting of time $T_f$ in a step 410. Next, in a step 411, the load cell type weight detector 4 measures the weight $W_f$ of the granules which have accumulated to the level where the level detector 28 is located in the granule flow pipe 2. Subsequently, in step 411a, an actual flow rate is calculated based on the weight $W_f$ measured in step 411 and the time $T_f$ measured in step 410. Upon completion of the measurement in the compensation mode as explained above, in a step 412, the calculation control circuit 19 outputs signals to the electromagnetic valves 15 and 16 so that both the rotatable plate 9 and the slidable plate 12 are opened. As a consequence, the cut-off state at the granule flow pipe 2 is released, and the granules start to flow in the granule flow pipe 2 again.

As soon as the granules start to flow in the flow pipe 2, in other words, upon issuance of the signals to the electromagnetic valves 15 and 16, the calculation control circuit 19 confirms again, in a step 404, as to which the current mode is between the normal mode and the compensation mode. Switching to the compensation mode may be performed manually by an operator at a desired timing or be performed automatically with a predetermined interval being provided. Further, since it is sufficient to carry out the compensation mode only at a desired timing or periodically, for example, in the case where the kind of the material granules is changed to another or the lot of the granules is changed to another, the compensation mode is switched to the normal operation mode after the compensation mode has been carried out once.

In the normal mode, the conversion from the capacitance measured at step 413 by the capacitance detector into the accurate flow rate of the granules flowing at present is carried out based on the various values obtained in the above compensation mode, in accordance with the following equations (1) and (2).

The actual flow rate $S_k$ obtained by the load cell type weight detector can be obtained from the equation (1).

$$S_k = \frac{W_f}{T_f} \; [t/h] \qquad (1)$$

wherein, $W_f$ represents an input weight of the granules, and $T_f$ represents an input time (accumulating time).

The conversion into the flow rate from the output detected by the capacitance detector is carried out in step 414 by the following equation (2).

$$S_m = K \times S_k \times \frac{(C_n - C_o)}{(C_k - C_o)} \; [t/h] \qquad (2)$$

wherein,

K represents a coefficient, $C_n$ represents a capacitance value in the normal mode, $C_o$ represents a vacant capacitance value, and $C_k$ represents a capacitance value in the compensation mode.

According to the above equation (1), the actual flow rate $S_k$ can be derived in step 411a from the actual weight (input weight) $W_f$ obtained at the compensation mode and the input time (accumulating time) $T_f$. According to the above equation (2) with the actual flow rate $S_k$ obtained at the compensation mode, the vacant capacitance $C_o$ under the vacant state before the confirmation of the modes, and the capacitance value $C_k$ when the granules are flowing at the compensation mode being used as constant values and, further, with the coefficient K specific to the capacitance detector being used, the flow rate $S_m$ converted from the capacitance can be obtained with the output $C_n$ from the capacitance detector at the normal mode being used as a parameter. Further, influence on the flow rate caused by the atmospheric temperature changes can be compensated by shifting the flow rate based on the temperature difference between the detected temperature of the granules and the standard temperature which has been set in advance for the capacitance detection. The flow rate $S_m$ derived from the capacitance and calculated according to the equation (2), which equation is formed based on the actual flow rate obtained in the compensation mode, is an extremely high precise value. By periodically switching to the compensation mode from the normal mode, the equation (2) for converting the capacitance into the flow rate can be appropriately calibrated. Thus, the capacitance type measuring apparatus according to the invention is capable of providing an accurate flow rate which is not influenced by the moisture content or the density of the granules. Further, by adopting the temperature compensation by the temperature detector, a still further precise flow rate can be obtained.

Figure 5:
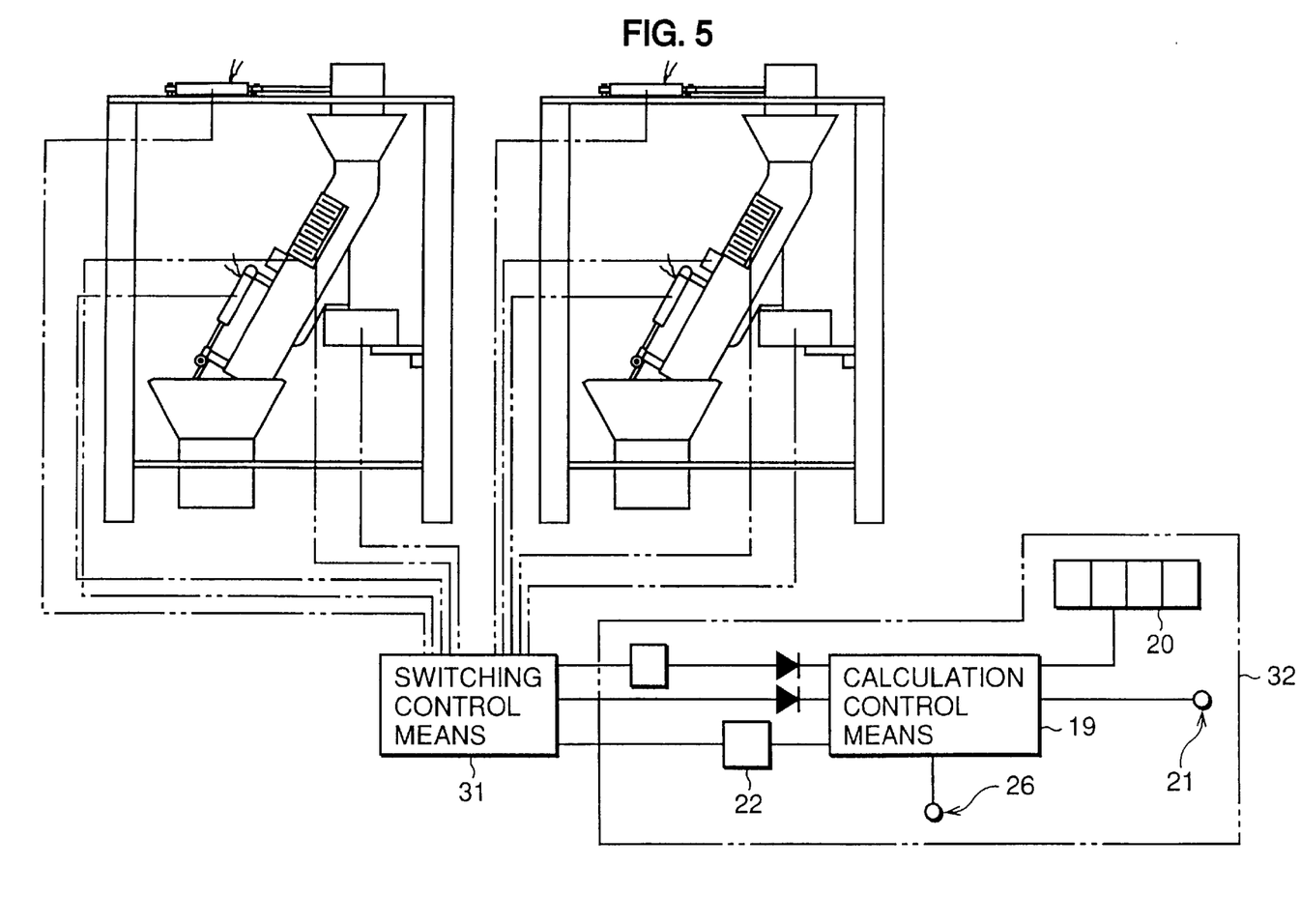
FIG. 5 is a circuit diagram wherein a plurality of detectors are connected to a common calculation control device through a switching control means.

FIG. 5 shows another embodiment of the flow rate measuring apparatus according to the invention in which a plurality of groups, each group comprising a capacitance detector, a load cell type weight detector, a level detector and upper and lower shutters that are arranged for one granule flow pipe, are connected to one common calculation control circuit 19 through a switching control means 31 for switching a plurality of input and output signals. In this way, in the case where a number of measuring apparatuses are used and centrally controlled, the number of the calculation control means can be reduced. As a result, the total cost for the entire system can be effectively reduced. Since the data from the respective flow rate measuring apparatuses can be individually read out by means of the communication means using, for example, an RS232C, there occurs no influence on the centralized control even though the number of the calculation control means is reduced.

Figure 6:
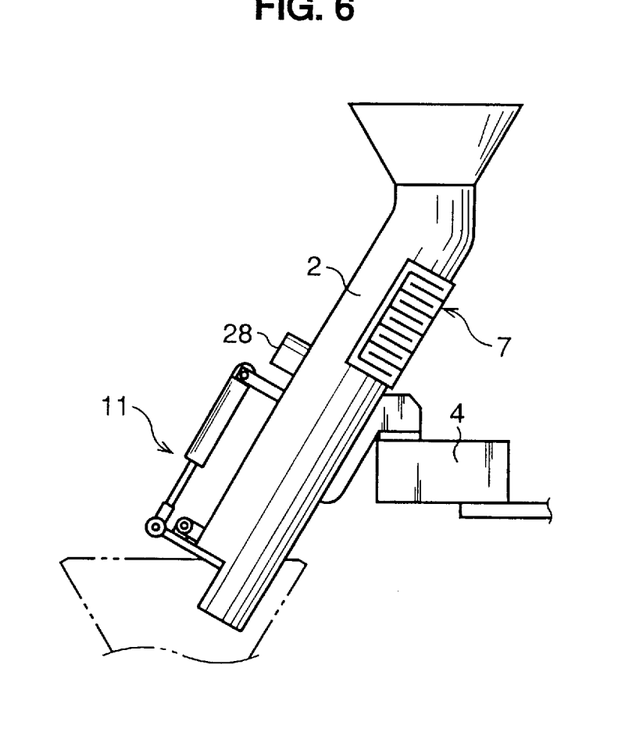
FIG. 6 is a diagrammatic view of another example of the capacitance detector.
Figure 7A:
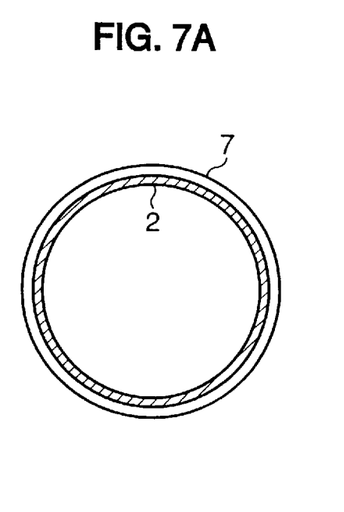
FIGS. 7A and 7B are diagrammatic views of further examples of the capacitance detector.
Figure 7B:
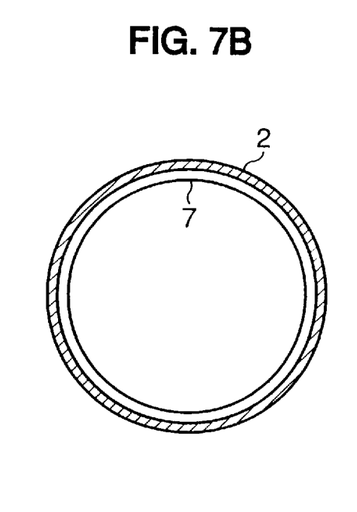

The position of the granule flow pipe 2 at which the capacitance detector 7 of the electromagnetic flow rate measuring apparatus 1 is fixed is not limitative to the upper surface of the granule flow pipe 2 (see FIG. 1). For example, as shown in FIG. 6, the capacitance detector 7 may be provided at the position where the granules flows, that is, a part of the lower external surface of the pipe 2. Further, the capacitance detector may be provided to the pipe 2 in such a manner that it fully covers an entire external surface of the pipe as shown in FIG. 7A or in such a manner that it fully covers an entire internal surface of the pipe as shown in FIG. 7B.

As explained hereinabove, according to the measuring apparatus of the present invention, since the flow of the granules is not cut off to a large extent and the measurement portion is basically a mere granule flow passage, there is no need of the provision of the additional devices and the possibility of wear-out of the various elements such as a detector is extremely low. The mechanical strength of the apparatus can be easily kept high. Since the apparatus is of the capacitance type, continuous measurement without touching to the granules can be carried out.

Further, in the apparatus of the present invention, by conducting the measurement of the compensation mode by the load cell type weight detector which is capable of measuring the actual weight in addition to the measurement by the electromagnetic flow rate detector, the error caused by the difference in the moisture content or the density can be effectively compensated by the values obtained from the load cell weight detector. Thus, it has been made possible to convert to an accurate flow rate from the capacitance value.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. An electromagnetic flow rate measuring apparatus for measuring a flow rate of granules flowing in a granule passage, the apparatus comprising:

a measurement passage which is provided in a passageway of said granule passage, the measurement passage coupled to said granule passage and in which the granules flow;

a capacitance detector which is arranged at the measurement passage and which measures the capacitance of the granules flowing in the measurement passage;

first and second shutters which are respectively and independently provided at first and second portions of said measurement passage to temporarily prevent entry of the granules into said measurement passage and exit of the granules from said measurement passage;

a load cell type weight detector on which said measurement passage is mounted and which measures an actual weight of the granules that are accumulated in said measurement passage within a predetermined time period based on an operation of said first and second shutters; and a calculation control means having a compensation mode and a normal mode, wherein in compensation mode the calculation control means calculates an actual flow rate based on the actual weight of the granules that have accumulated within the measurement passage during the predetermined time period, and in normal mode the calculation control means calculates a converted flow rate based on the capacitance of the granules flowing in the measurement passage, the converted flow rate being compensated in such a way that a difference between the normal flow rate and the actual flow rate is essentially zero.

2. The electromagnetic flow rate measuring apparatus according to claim 1, further comprising a temperature detector arranged in the passageway of the granule passage for measuring a temperature of the granules, the temperature detector connected to said calculation control means, and said calculation control means performing a temperature compensation when the capacitance is converted to the converted flow rate.

3. The electromagnetic flow rate measuring apparatus according to claim 1, further comprising a switching control means for selecting a group among a plurality of groups, each group having said capacitance detector, said load cell type weight detector, and said first and second shutters, and for connecting the selected group to said calculation control means.

4. A method for compensating a flow rate of granules measured by an electromagnetic flow rate measuring apparatus having a capacitance detector and a load cell type weight detector, said method comprising the steps of:

calculating an actual flow rate and a density of the granules from an actual weight of the granules measured by said load cell type weight detector;

obtaining a compensation coefficient from said actual flow rate and said density; and calculating a converted flow rate from a capacitance of the granules measured by said capacitance detector, the converted flow rate being compensated in such a manner that a difference between said converted flow rate and said actual flow rate is made essentially zero using said compensation coefficient.

* * * * *